(12) United States Patent
Svensson

(10) Patent No.: US 8,398,052 B2
(45) Date of Patent: Mar. 19, 2013

(54) SUBSEA HYDRAULIC COUPLER

(75) Inventor: Adrian N Svensson, Maidenhead (GB)

(73) Assignee: Aker Subsea Limited, Maidenhead, Berkshire (GB)

( * ) Notice: Subject to any disclaimer, the term of this patent is extended or adjusted under 35 U.S.C. 154(b) by 343 days.

(21) Appl. No.: 12/789,651

(22) Filed: May 28, 2010

(65) Prior Publication Data
US 2010/0300567 A1    Dec. 2, 2010

(30) Foreign Application Priority Data

May 30, 2009   (GB) .................................. 0909342.8

(51) Int. Cl.
*F16K 23/00* (2006.01)
(52) U.S. Cl. ...................... 251/143; 251/148; 251/149.6
(58) Field of Classification Search .................. 251/143, 251/149.6, 148; 137/512.1; 138/106, 109; 285/136.1, 139.1, 189, 415
See application file for complete search history.

(56) References Cited

U.S. PATENT DOCUMENTS

| | | | |
|---|---|---|---|
| 4,630,415 A * | 12/1986 | Attwell | 52/321 |
| 4,699,177 A * | 10/1987 | Thomas | 138/103 |
| 5,647,398 A | 7/1997 | Giesler | |
| 6,394,131 B1 * | 5/2002 | Fross et al. | 137/614.05 |
| 7,163,190 B2 * | 1/2007 | Smith, III | 251/149.6 |
| 7,712,791 B1 * | 5/2010 | Whitehead | 285/215 |
| 8,132,780 B2 * | 3/2012 | Tibbitts | 251/149.7 |
| 2006/0266964 A1 | 11/2006 | Farley | |
| 2009/0159824 A1 | 6/2009 | Tibbitts et al. | |
| 2011/0175003 A1 * | 7/2011 | Massie et al. | 251/129.01 |

FOREIGN PATENT DOCUMENTS

| | | |
|---|---|---|
| GB | 2 431 453 | 4/2007 |
| WO | 2008/074973 | 6/2008 |

\* cited by examiner

*Primary Examiner* — John K Fristoe, Jr.
*Assistant Examiner* — Reinaldo Sanchez-Medina
(74) *Attorney, Agent, or Firm* — Nixon & Vanderhye PC

(57) ABSTRACT

A subsea stab plate assembly includes a stab plate which has apertures each extending in an axial direction through the plate from a front face of the plate to a rear face of the plate. A subsea hydraulic coupler has a body with an internal longitudinal passageway including a valve operable to open the passageway on the mating of the coupler with a complementary coupler. The coupler is shaped for insertion through an aperture in either of two directions, having a circumferential groove and a flange assembly including an axially extending hub which fits into the groove and a shoulder for abutment against the front face of the plate. The flange assembly includes a plurality of separable segments, each of which constitutes part of the hub and part of the shoulder. The hub fits between the groove and the inside of the aperture.

10 Claims, 3 Drawing Sheets

SUBSEA HYDRAULIC COUPLER

TECHNICAL FIELD

This application relates to subsea hydraulic couplers.

BACKGROUND

Hydraulic couplers are used subsea to provide a valve-controlled connection between hydraulic lines. Normally a coupler of this kind has an elongate body with an internal longitudinal passageway which at one end is adapted for coupling to a hydraulic line and includes a valve openable on mating of the coupler with a complementary coupler to provide hydraulic communication through the passageway. Many different designs are known, and typical examples are described in for example the published International patent applications WO 2007/045811 and WO 2008/074973.

Subsea modules and other subsea equipment normally require a multiplicity of hydraulic couplers and it is customary to mount an array of such couplers on a mounting plate, often called a 'stab' plate. Typically female or socket couplers are mounted on one such plate whereas the male or probe couplers are mounted on another plate, the plates being closed together to effect mating of each pair of complementary couplers.

Typical designs, such as those described in the aforementioned applications, include a valve in the form of a poppet of which the nose is depressed away from a part-conical seat when the coupler is mated with a complementary coupler.

Most designs of subsea couplers have an annular shoulder which protrudes radially from the main body of the coupler and abuts against the front face of the mounting plate, and a retainer, in the form of either a nut or a washer and spring clip, which engages the body of the coupler and the rear face of the mounting plate to secure the body of the coupler in the respective aperture of the mounting plate.

Such designs of coupler can be inserted only in one direction, i.e. into the front face of the mounting plate. Some designs allow for insertion of the coupler into the mounting plate from the rear thereof but in such designs the aforementioned retainer engages the front face of the mounting plate. When hydraulic couplers are mated, owing to the normally very high pressure in the hydraulic lines, the very high separation force on the couplers is borne by the retainer.

The present exemplary embodiment concerns an improved design of coupler which can be inserted through an aperture of the mounting plate in either direction and which can readily be disposed so that the separation forces generated when the system is pressurized are not carried by the retainer.

BRIEF SUMMARY

The present exemplary embodiment relates particularly to a subsea hydraulic coupler adapted for insertion through an aperture in a mounting plate, comprising: a body having an internal longitudinal passageway including a valve operable to open the passageway on the mating of the coupler with a complementary coupler. The coupler is shaped for insertion through the aperture in either of two directions, the body having a circumferential groove and a flange assembly comprising an axially extending hub which fits into the groove and a shoulder for abutment against a face of the plate. The flange assembly comprises a plurality of separable segments each of which constitutes part of the hub and part of the shoulder, and the groove and flange assembly are positioned on said body such that a separation force generated on the said mating reacts against the said shoulder.

The exemplary embodiment also concerns a subsea stab plate assembly comprising a stab plate which includes a multiplicity of apertures each extending in an axial direction through the plate from a front face of the plate to a rear face of the plate, and a subsea hydraulic coupler as described for insertion through at least one of the apertures.

Normally the body would be cylindrical for fitment into a circular aperture and has a maximum outside diameter corresponding to the inside diameter of the aperture.

DETAILED DESCRIPTION OF A PREFERRED EMBODIMENT

Figure 1:
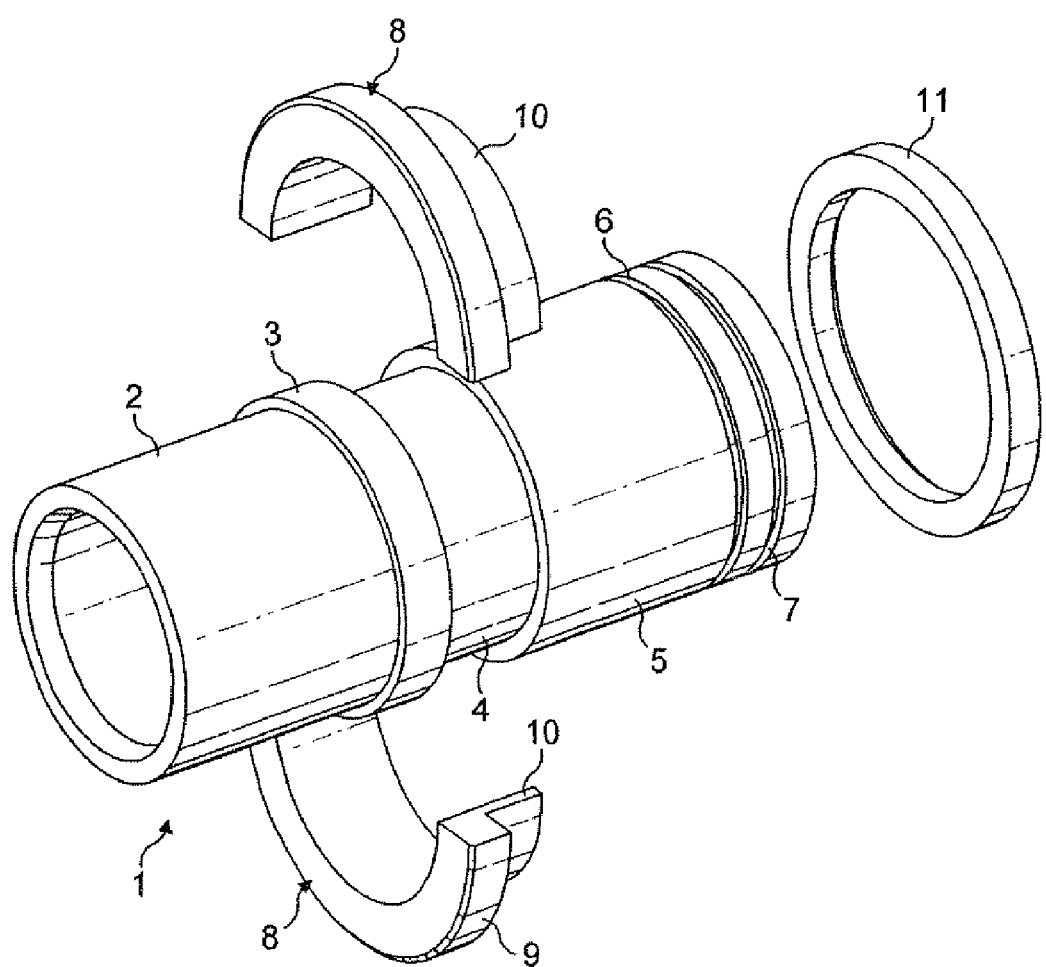
FIG. 1 is an exploded perspective view of a coupler according to the invention and its accessory parts.

FIG. 1 of the drawings illustrates a coupler which has an elongate body 1 which is cylindrical in form. The body has a front section 2 of constant outside diameter and a slight shoulder 3 which defines one end of a circumferential groove 4 in the body 1. The other end of the groove 4 is defined by a section 5 which has the same outside diameter as the shoulder 3 and extends to the rear end of the body 1. At the rear end of the body 1 are small peripheral grooves 6 and 7.

Also shown in FIG. 1 are the part-circular segments (in this example semi-circular segments) 8 of a flange assembly. Each segment has a shoulder portion 9 and a hub portion 10. The hub portions of the segments 10 can fit into the annular groove 4 to constitute a complete flange of which the shoulder protrudes radially from the body 1.

Also shown in FIG. 1 is a retainer 11 which can be fitted to the rear end of the body.

Figure 2:
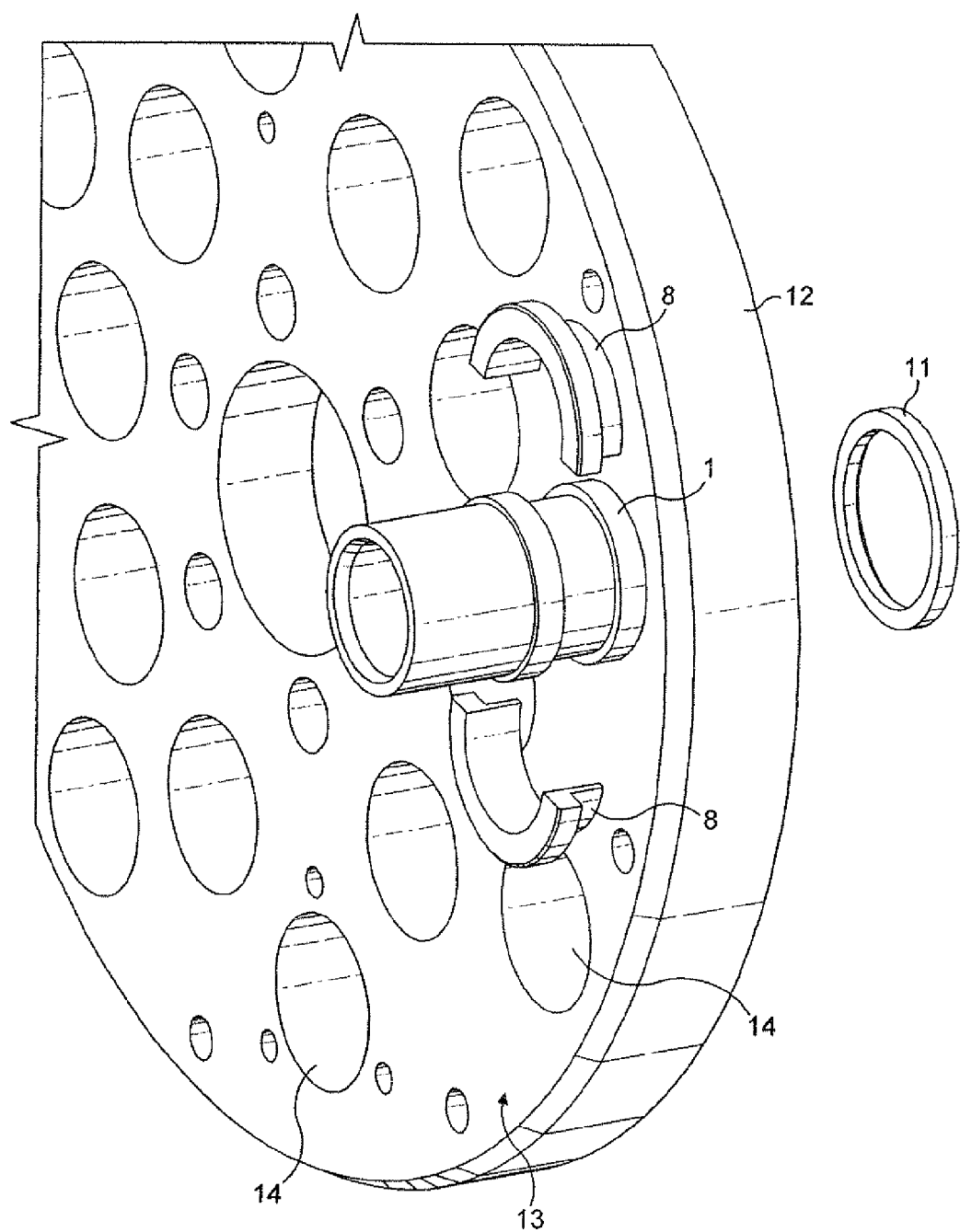
FIG. 2 is a perspective view illustrating the body of a coupler inserted in a mounting plate before final assembly.

FIG. 2 shows a stab plate 12 which has a multiplicity of apertures 14 extending through the plate 12 from the front face 13 to the rear face (not shown in FIG. 2). In FIG. 2 the body 1 is shown as partly inserted into one of the apertures 14. Because the maximum outside diameter of the body corresponds to the inside diameter of the aperture the body can be inserted in either direction through the aperture and moved axially before the flange assembly 8, 8 and the retainer 11 are fitted to it. The flange segments are fitted into the groove 4 before the body is moved to its final axial position.

Figure 3:
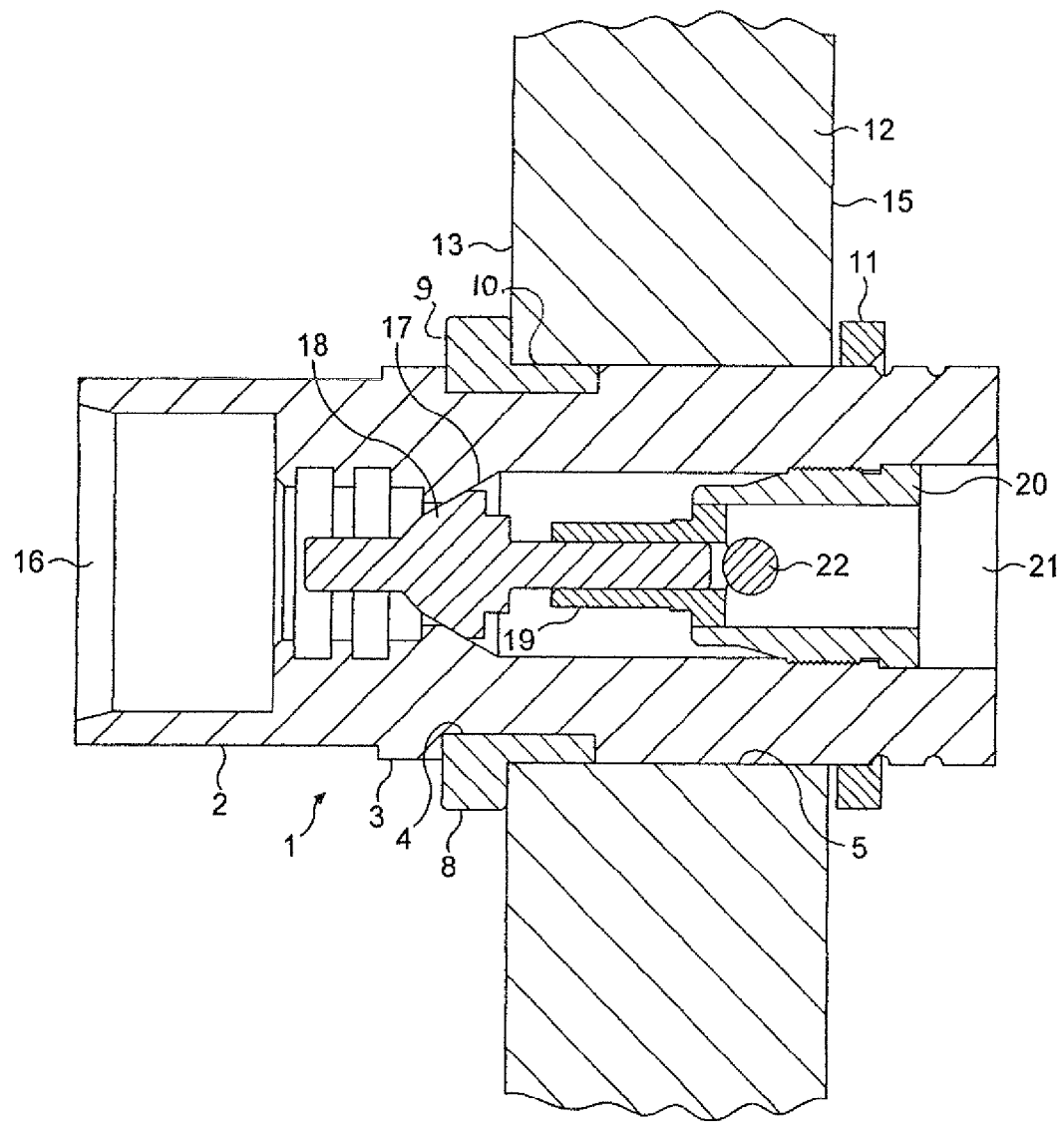
FIG. 3 is a sectional view of the coupler mounted in position on a mounting plate.

FIG. 3 illustrates the coupler fitted within the aperture 14 and in its finally assembled state. The groove 4 is partly within and partly outside the aperture, so that the shoulder portions 9 abut the front face 13 of the plate 12 and the hub portions fit between the groove 4 and the inside of the aperture 14. The retainer is fitted, engaging the groove 6 and the rear face 15 of the plate 12.

The coupler shown in the drawing has an internal passageway which includes a socket 16 for the reception of a complementary coupler. In this example the coupler is a female coupler but of course the same external form of the body is applicable to a male coupler. Within the internal passageway is a part-conical valve seat 17 for a valve 18 in the form of a poppet. The stem of the poppet 18 extends into a sleeve 19 extending from an insert 20 locked into the rear chamber 21 of the coupler. The valve 18 is urged against the seat 17 by means of a compression spring (omitted for clarity) mounted on the sleeve and extending between the insert and the poppet. Examples of such a construction are shown in the aforementioned published applications. In this particular example the insert 20 includes an additional ball valve 22.

This particular design of coupler is, in common with many similar designs, arranged so that when the coupler, which in this example is a female or socket coupler, is mated with a male or probe coupler, the noses of the poppet valves mutually engage to depress the valve poppets away from their seats in a direction corresponding to he direction into the respective mounting plate and to allow communication through the respective internal passageway. As mentioned previously, the separation forces generated when the couplers are engaged are very high. However, the separation force generated by the hydraulic coupling when the hydraulic system is pressurized reacts onto the shoulder of the flange assembly, which accordingly spreads the load between the mounting plate and the body of the coupler.

Thus the construction provides a bidirectionally insertable coupler which avoids the application of hydraulically generated separation forces on the retainer.

What is claimed is:

1. A subsea hydraulic coupler adapted for insertion through an aperture of predetermined inside diameter in a mounting plate having a front face and a rear face, said coupler comprising:
   (i) a body having an internal longitudinal passageway including a valve operable to open the passageway on mating of the coupler with a complementary coupler, wherein said body is shaped for insertion through said aperture in either of two directions through the front face side or the rear face side, said body having a maximum outside diameter corresponding to said predetermined inside diameter, and the body has a circumferential groove; and
   (ii) a flange assembly for fitment on said body, said flange assembly comprising a plurality of separable segments, each segment comprising an axially extending hub portion which fits into the groove and a shoulder portion for abutment against said front face of the plate for both said two directions of insertion of said body;
   said groove and said flange assembly, when fitted on said body, are positioned on said body such that a separation force generated on said mating reacts against the shoulder portions of said flange assembly.

2. The subsea hydraulic coupler of claim 1, wherein said separable segments are semi-circular.

3. The subsea hydraulic coupler of claim 1, further comprising a retainer which engages said body of the coupler and said plate on the opposite side to said face.

4. The subsea hydraulic coupler of claim 1, wherein said valve comprises a poppet which engages a valve seat and is depressible away from said seat in a direction corresponding to a direction into said plate on the mating of the couplers.

5. The subsea hydraulic coupler of claim 1, in which said hub portions fit between said groove and the inside of said aperture.

6. A subsea stab plate assembly comprising:
   a stab plate which includes a multiplicity of apertures each extending in an axial direction through the stab plate from a front face of the plate to a rear face of the plate; and
   a subsea hydraulic coupler for insertion through at least one of said apertures, the coupler comprising:
   (i) a body having an internal longitudinal passageway including a valve operable to open the passageway on mating of the coupler with a complementary coupler; wherein said body is shaped for insertion through the said one of said apertures in either of two directions, through the front face side or the rear face side, the body having a maximum outside diameter corresponding to an inside diameter of said at least one of said apertures and also having a circumferential groove; and
   (ii) a flange assembly for fitment on said body, said flange assembly comprising a plurality of separable segments, each segment comprising an axially extending hub portion which fits into the groove and a shoulder portion for abutment against said front face of the plate for both said two directions of insertion of said body.

7. The subsea stab plate assembly of claim 6, wherein said segments are semi-circular.

8. The subsea stab plate assembly of claim 7, further comprising a retainer for engagement with said body of the coupler and said plate on the rear face thereof.

9. The subsea stab plate assembly of claim 6 wherein said the valve comprises a poppet which engages a valve seat and is depressible away from said seat in a direction corresponding to a direction into the plate on the mating of the couplers.

10. The subsea stab plate assembly of claim 6 wherein said hub portions fit between said groove and the inside of said one of the apertures.

* * * * *